Patented Feb. 25, 1941

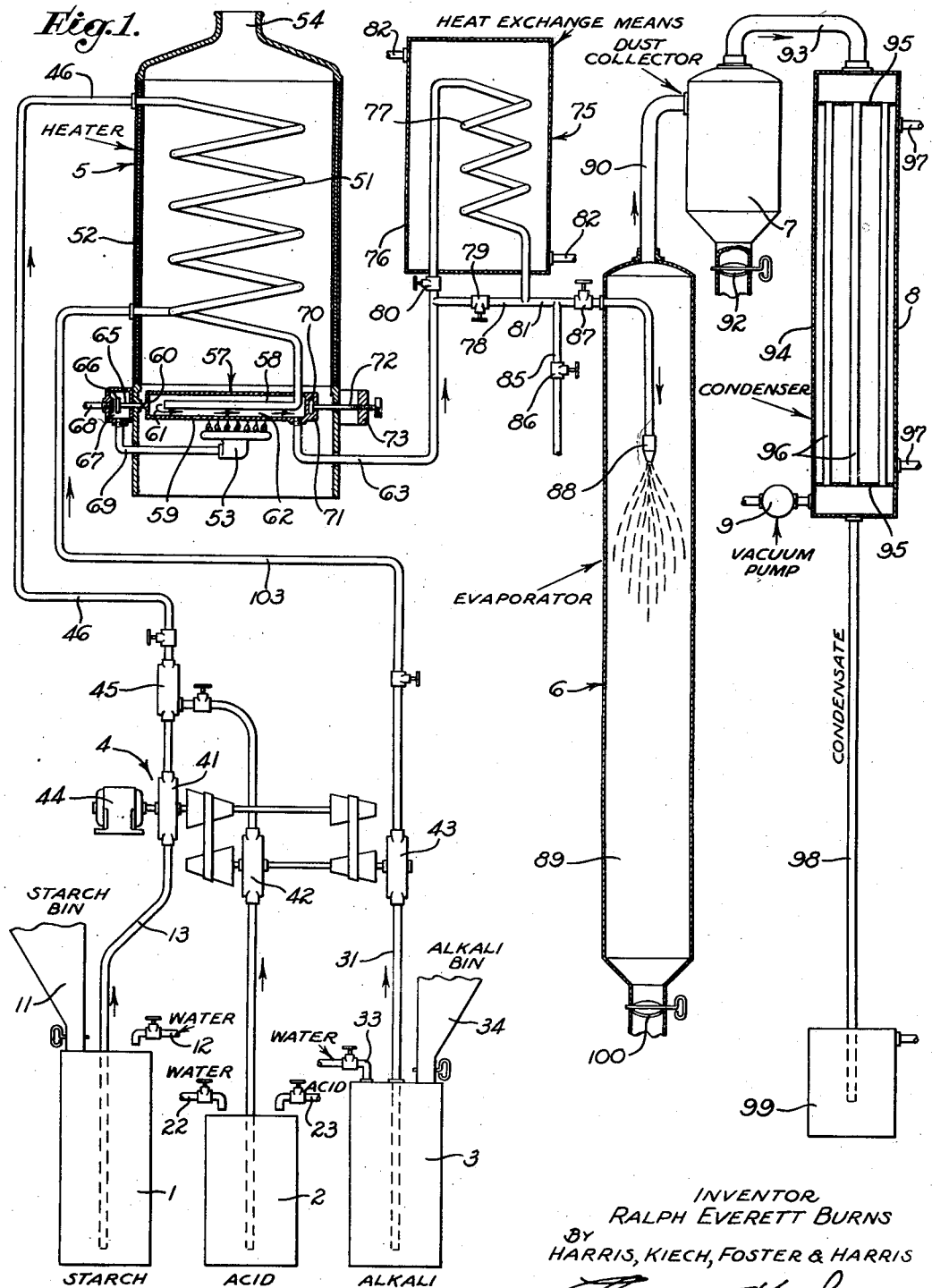

2,233,243

UNITED STATES PATENT OFFICE 2,233,243

PROCESS FOR PRODUCING HYDROLYZED PRODUCTS

Ralph Everett Burns, West Covina, Calif., assignor to Refining, Inc., Reno, Nev., a corporation of Nevada Application January 17, 1939, Serial No. 251,447

15 Claims. (Cl. 127—38)

This invention relates to the production of hydrolyzed products from starch and, more particularly, to a novel process by which the hydrolyzed product can be produced very quickly in an economical manner, and in which the moisture content of the product can be readily controlled.

If starch is heated in the presence of water under pressure, certain hydrolyzed products, such as maltose, dextrine, and glucose, are formed, a common product being called "British gum" which is widely used in the manufacture of adhesives. Most commonly, such products are now produced by use of batch processes. In some instances, the conversion of the starch into hydrolyzed products is facilitated if small amounts of an acid are added to the suspension, but the presence of this acid is usually detrimental in the final product.

It is an object of the present invention to provide a novel process of producing various hydrolyzed products from starch, this process being preferably of a continuous nature.

Another object of the invention is to provide such a continuous process in which an acid catalyst can be used, if desired, and in which the finished product can be substantially free of acid. By way of example, the process contemplates continuous acidulation and, if desired, continuous neutralization of the product, or, in some instances, all or a portion of the acid can be removed in vapor state.

Another object of the invention is to produce a hydrolyzed product containing a desired amount of moisture. In this connection, the process contemplates the removal of any desired proportion of the water from a stream of the hydrolyzed products and is capable of producing a substantially anhydrous product, usually in powdered or subdivided form, or a subdivided product containing a desired amount of moisture, or a liquid product containing any desired proportion of the water originally present in the incoming starch-water dispersion. This control of moisture content of the finished product is made possible by my continuous process through proper control of temperatures and pressures in various portions of the system.

I prefer to hydrolyze the product during advancement through an elongated heating zone in which such conditions of mild turbulence are maintained as will keep all of the constituents of the stream uniformly mixed, the resulting stream discharging into a vapor-separating chamber in which vapors separate from the hydrolyzed product. One of the features of the process is that air can be excluded from this vapor-separating chamber, thus resulting in an improved product and avoiding the large expense and deleterious action of heated air in removing moisture from the hydrolyzed product. Another feature of the invention is that this vapor-separating chamber can be maintained under vacuum, if desired, with many attendant advantages, as mentioned hereinafter.

It is an object of the present invention to discharge a stream of the hydrolyzed product into a vapor-separating chamber from which air is excluded, and to control the temperature and pressure in various portions of the closed system to produce a resulting hydrolyzed product of desired moisture content.

Another object of the invention is to effect the conversion of the starch in an elongated heating zone and to adjust the temperature of the resulting product before discharge into a vapor-separating zone.

Another feature of the invention is the possibility of hydrolyzing the starch-water dispersion in the presence of some vapor and, in this connection, it is an object of the present invention, in one mode of operation, to vaporize a portion but not all of the water during advancement through the elongated heating zone and to maintain the resulting vapors uniformly dispersed in the stream.

Further objects and advantages of the invention will be made evident hereinafter.

In the annexed drawing, which is for illustrative purposes only, I show diagrammatically an apparatus by which the process can be performed.

Referring particularly to the drawing, the apparatus, in general, may include a starch tank 1, an acid tank 2, and an alkali tank 3. Materials from these tanks are continuously fed into the hydrolyzing apparatus through a pumping means 4 in proper proportions and are heated in a heater 5. The resulting stream is released into an evaporator 6 in which vapors separate from the product and are forcibly withdrawn to a dust collector 7 and moved thence to a condenser 8 under the action of a vacuum pump 9. The finished hydrolyzed product falls to the bottom of the evaporator and may be withdrawn as desired.

More specifically, the starch tank 1 may be of any convenient size and may be provided with air or mechanical agitation for the purpose of thoroughly mixing the contents thereof. The dry starch to be converted is delivered to the tank 1 from a starch bin 11, and a suitable amount of water is delivered to the same tank through a valve pipe 12. In the tank 1, the starch and water are mixed to a consistency which will permit ready pumping of the dispersion of starch and water thus produced.

The acid tank 2, if used, consists of a tank made of a material which will resist dilute acid. Diagrammatically, I have shown valved pipes 22 and 23 for respectively delivering water and acid to this tank for preparation of the desired catalytic acid solution. Such acid catalysts are well known in the art, sulphuric, hydrochloric, or nitric acid being typical examples. In some instances, I prefer to use acids which can be readily volatilized and separated from the hydrolyzed product in vapor state, for example hydrochloric and nitric acid, the vapors being removed with the steam from the upper end of the evaporator 6.

The alkali tank, if used, serves to retain any suitable neutralizing agent capable of neutralizing the acid. Carbonate of soda or caustic soda are typical examples. The alkali may be mixed in the tank 3, if desired, the water and alkali being respectively delivered thereto in proper amounts through a pipe 33 and a bin 34, respectively.

The pumping means 4 is designed to deliver proportioned amounts of the materials from the tanks 1, 2, and 3 to the subsequent equipment. This pumping means may include a starch pump 41, an acid pump 42, and an alkali pump 43. These pumps may be driven by any convenient means, such as an electric motor 44, and any suitable pumping-control system can be used. Diagrammatically, I have shown a variable-cone pulley driving gear for operating the pumps 42 and 43 so that any desired proportions of the materials can be delivered to the apparatus. It will be clear, however, that this showing is merely diagrammatic and that any other convenient means can be used for proportioning the various materials.

The starch-water dispersion discharged from the pump 41 is delivered to a mixing device 45 and, in the event that acid is to be used, the pump 42 is set into operation to deliver a stream of the acid to this mixing device. Any suitable mixing means may be used in this connection but it is usually sufficient to bring streams of the starch-water dispersion and acid into turbulent contact in the mixing chamber formed by the mixing device 45.

The resulting mixture flows under pressure through a pipe 46 to a coil 51 forming a part of the heater 5, this coil providing an elongated heating zone and being disposed in a housing 62. Various heating sources can be used, the one diagrammatically shown including a fuel burner 53 disposed beneath the coil 51 and delivering products of combustion which move upward in the housing to be discharged through a flue 54. As the starch-water dispersion flows along the elongated heating zone under pressure, it is gradually heated to effect the desired conversion. It is a feature of the present invention that this heating is carried out under mild turbulent flow, the size of the elongated heating zone being so proportioned with respect to the rate of flow that the stream will be kept turbulent to prevent local overheating thereof and to maintain all of the constituents of the stream uniformly mixed.

In some instances, I have found it desirable to heat the stream to a temperature sufficient to form some vapors therein before this stream is discharged to the evaporator 6. The heat units necessary to effect this vaporization can thus be stored in the stream to facilitate later vapor separation while, at the same time, any vapors thus formed in the lower end of the elongated heating zone will be maintained uniformly dispersed in the stream, thus avoiding the formation of steam pockets, etc., which would prevent the discharge of a heated stream of uniform constituents from time to time. It is desirable to avoid any system in which the steam segregates in the heating zone so that the discharged stream would comprise a predominance of steam at one instant and a predominance of hydrolyzed material at another.

It is believed to be new to continue the conversion in the presence of vapors formed by partial vaporization of the water present in the incoming starch dispersion. The formation of such vapors tends to increase the concentration of the acid catalyst, if used, and makes possible the use of lower temperatures in the elongated heating zone if a substantially dry product is desired. In addition, when such vapors are formed in a moving stream, the stream expands and the forward velocity is considerably increased even if only a small portion of the water is vaporized. This increased velocity tends to insure a uniform mixture and to prevent any possibility of scorching in the higher temperature portion of the elongated heating zone. In addition, the presence of steam in the stream reaching the nozzle discharging into the evaporator 6 will modify the pattern of the resulting jet and otherwise facilitate the conversion of the starch-water dispersion.

Regardless of whether or not vapors are formed in the elongated heating zone, it is often desirable, particularly when using products of combustion for heating, to control the degree of heating automatically. A thermostatic means responsive to the thermal condition of the heated stream before discharge into the evaporator 6 is well adapted to this purpose and, in Figure 1, such a means is indicated by the numeral 57. As there shown, the end of the coil 51 communicates with an inner pipe 58 extending into an outer pipe 59 in a direction toward a head 60 of the latter. The heated stream thus moves through the inner pipe 58 and reverses its direction of movement, with resulting turbulence, as indicated by the numeral 61, after which the stream can flow along an annular space 62 between the inner and outer pipes 58 and 59 to discharge through a pipe 63. The outer pipe 59 is disposed to be directly contacted by the products of combustion and the stream flowing through the annular space 62 can thus receive additional heat. Furthermore, this stream exerts a cooling action on the outer pipe 59, depending both upon the temperature of the stream and the amount of vapors, if any, therein. If no vapors have been formed in this stream, the rate of heat transfer from the outer pipe 59 to the stream is much larger than if vapors are present in the stream flowing through the annular space 62. In fact, such a thermostatic means can be used to control with great accuracy the proportion of vaporized and non-vaporized constituents in this stream.

The temperature of the outer pipe 59 will thus be intermediate the temperature of the annular stream and the temperature of the products of combustion. In the embodiment shown, the expansion and contraction of the outer pipe 59 is used for controlling the amount of fuel delivered to the burner 53. This can be accomplished by a rod 65 carrying a valve member 66 in a valve chamber 67 to which fuel is supplied through a pipe 68. Expansion and contraction of the outer pipe 59 thus tends to close or open the discharge from the pipe 68. A pipe 69 conducts the fuel from the valve chamber 67 to the burner 53.

The opposite end of the outer pipe 59 is adjustably positioned so that any desired thermal condition can be obtained. Diagrammatically, the adjustment means is shown as including a disc 70 positioned in a corresponding cavity of a head 71 of the outer pipe 59 and connected to a pin 72 threadedly received by a ring 73 which may extend peripherally around the housing 52 to be connected with the walls defining the valve chamber 67. By turning the pin 72, the disc 70 is advanced inward or outward to control the position of the head 71 and thus change the fuel-controlling position of the valve member 66. Thus, by turning the pin 72, any desired thermal condition can be obtained and the thermostatic means will operate automatically to maintain this thermal condition.

It is sometimes desirable to adjust the temperature of the heated stream or to maintain this temperature for an additional period of time before releasing the heated stream into the evaporator 6. A heat-exchange means 75 is shown in this connection and may include a container 76 in which a coil 77 is positioned. A by-pass 78 is provided for the coil and equipped with a valve 79. By closing this valve and opening a valve 80, the heated stream will move through the coil 77 and be discharged through a pipe 81. During this operation, a heating or cooling medium may be circulated through the container 76 by use of connections 82. By use of the means 75, it is possible to maintain the heated stream at elevated temperature for a period of time to carry forward the hydrolyzing actions to produce the desired product. On the other hand, additional heat may be imparted to the stream in the heat-exchange means 75, though, in some instances, it is quite advantageous to circulate a cooling medium therethrough to control the temperature of the product which is to be released into the evaporator 6. The length of time that the stream remains in the heat-exchange means 75 can be modified by changing the length of the coil 77. Also, if desired, the valves 79 and 80 may each be partially open to by-pass a portion of the heated stream, thus making possible the presence in the pipe 81 of products which have been hydrolyzed to different extents.

In the event that the stream has been cooled to an extent sufficient to preclude any deleterious reactions upon exposure to air, the heated stream may be by-passed from the pipe 81 through a pipe 85 by opening a valve 86 therein, thus permitting the heated stream to discharge into any suitable container. Some of the water may flash from the stream upon such discharge into the container and a hydrolyzed product in liquid state can be produced in this manner, the moisture content being controlled by the temperature and pressure of the discharged stream.

Usually, however, I prefer to move the heated stream along the pipe 81 through a valve 87 and release it into the evaporator 6 through a nozzle 88. Often, this nozzle is of a restricted nature to impose a back pressure on the stream during heating in the elongated heating zone, though such a restriction is not essential to the process as a considerable pressure head will be built up in the heating zone due to the friction of the stream advancing to the evaporator 6.

The evaporator 6 preferably forms a vapor-separating chamber 89 from which air is excluded. As the heated stream discharges through the nozzle 88, any vapors already present in the stream, or formed by a reduction in pressure, will separate from the hydrolyzed product and move upward through a pipe 90 to the dust collector 7 in which any small entrained particles of the hydrolyzed product can separate and be removed through a discharge means 92. The vapors will continue their movement from the dust collector 7 through a pipe 93 to the condenser 8, which includes a housing 94 in which heads 95 are positioned, and between which extend pipes 96 which receive the vapors. Any suitable cooling medium may be circulated through the housing 94 around the pipe 96 by connections 97 to condense these vapors. The condensate may move downward through a column 98 of appropriate length and be discharged beneath the surface of a body of the condensate in a receiver 99. Any uncondensed vapors, or any non-condensable products, can be withdrawn by the vacuum pump 9. Such a system can be operated in such manner that the pump 9 will maintain any desired vacuum in the vapor-separating chamber 89 and, in many instances, I find it distinctly advantageous to use a vacuum in this chamber.

The hydrolyzed product drops in the vapor-separating chamber to the lower end thereof and can be removed as desired through a discharge means 100 which is preferably constructed in such manner as to preclude entrance of air into the vapor-separating chamber 89. This discharge means 100 is diagrammatically shown in the drawing as including an airtight valve which can be opened to remove the hydrolyzed product from the vapor-separating chamber.

The moisture content of the hydrolyzed product is controlled by the temperature and pressure in various portions of the system. By way of example, it is usually desirable to release the stream into the vapor-separating chamber of the evaporator 6 while at a temperature above the boiling point of water measured at the existing pressure which is maintained in this chamber. This permits some of the water to be separated from the hydrolyzed product in vapor state even though no vapors were formed in the elongated heating zone. By increasing the temperature of the incoming stream, a greater proportion of the water can be vaporized even in the absence of vapor formation in the elongated heating zone and, likewise, some or all of the acid catalyst, if used. If the incoming stream temperature is sufficiently high, substantially all of the vaporizable constituents of the stream can be separated in vapor state, with the production of a hydrolyzed product which is substantially anhydrous.

However, in the production of certain hydrolyzed products, it is sometimes not desired to use such high temperatures and two features of the process can be used advantageously in this connection. In the first place, the temperature of the incoming stream can be maintained lower, with substantially the same removal of vapors, by maintaining a partial vacuum in the vapor-separating chamber 89. If a relatively high vacuum is maintained therein, the necessary temperature to produce volatilization will be correspondingly lower and the temperature of the resulting hydrolyzed product collecting in the vapor-separating chamber will also be lower. In the second place, it is possible to store additional heat units in the stream before discharge into the vapor-separating chamber by supplying sufficient heat to the elongated heating zone to convert a portion of the water into steam, thus storing in the stream the heat of vaporization so that the additional heat units will be available for vaporizing additional water at the lower pressure in the vapor-separating chamber 89. In fact, I find it desirable, in many instances, to convert a portion, but not all, of the water into steam in the elongated heating zone to better the converting action, thus making possible the continuance of the conversion of the starch in the presence of water which is partially in vapor state and partially in liquid phase.

The particular hydrolyzed product or products produced by the conversion of starch are determined both by temperature and time. For example, if the conversion is to be carried to such an extent as to produce substantially pure dextrose, correspondingly higher temperatures and correspondingly prolonged conversion time can be used by proper control of the apparatus. Likewise, if intermediate products, such as soluble starch, various dextrines, British gum, etc., are to be produced, the temperatures can be correspondingly lower and the conversion time shorter. By way of example, if it is desired to produce a hydrolyzed starch such as British gum without the use of an acid catalyst, a suitable mixture of starch and water will be pumped through the pump 41 and heated in the elongated heating zone to from 330° F. to 520° F., the valve 80 being closed and the valve 79 being open so that the heated mixture is delivered directly to the nozzle 88. A pressure of from 30 to 250 lbs./sq. in. may be imposed at the inlet end of the coil 51, though the pressure at the discharge end will be considerably lower, depending upon the friction head developed in the elongated heating zone. With acid catalysts, or with a more prolonged conversion time as by passing the heated stream through the passage of the heat-exchange means 75, somewhat lower temperatures can be used in the elongated heating zone.

The heat-exchange means 75 can be used to prolong the conversion time while, if desired, adjusting the temperature of the stream during flow therethrough. In some instances, additional heat may be supplied to the stream during flow through this heat-exchange means 75 at a somewhat lower pressure than is present in the elongated heating zone. This reduced pressure is due to the frictional drop in pressure through the intervening pipe and, if desired, through the valve 80. Correspondingly, the subsequent portion of the conversion may be carried out under lower pressures than those present in the first portion of the system.

On the other hand, the temperature of the stream may be merely maintained during flow through the heat-exchange means 75 to permit continuance of the conversion. In many instances, a definite cooling action can be used to advantage at this point of the process, thus adjusting the temperature to such a value that the desired amount of moisture will be separated in vapor state from the hydrolyzed product in the vapor-separating chamber. Thus, in some instances, it is possible to operate entirely in the liquid phase in the coil 51, yet cool the resulting stream to the desired point in the heat-exchange means 75. In other instances, it is possible to form some vapors in the coil 51 and, by circulating a cooling medium through the heat-exchange means 75, all or a portion of such vapors can be condensed, thus making possible a process in which one portion of the conversion takes place in the presence of vapors and a subsequent portion takes place in the liquid phase.

Thus, the process is capable of producing a wide variety of hydrolyzed products, depending upon appropriate selection of temperature and time of conversion. Likewise, the water content of the hydrolyzed product can be varied over wide limits. If desired, the product can be collected in and withdrawn from the vapor-separating chamber 89 in subdivided condition and the moisture content of the particles can be accurately controlled by determination of the temperature and pressure of the incoming stream with reference to the temperature and pressure in the vapor-separating chamber. In fact, one of the uses of the process is to produce grape sugar in a direct manner and of desired moisture content, thus eliminating the steps necessary in a batch process involving crystallization of concentrates to produce the grape sugar which is centrifuged out.

On the other hand, it is not essential to collect the hydrolyzed product in subdivided condition. In some instances, this product may accumulate in and be withdrawn from the vapor-separating chamber in liquid state. By way of example, if most of the water is allowed to remain in the hydrolyzed product rather than separating it therefrom in vapor state, the resulting hydrolyzed product may collect as a liquid in the vapor-separating chamber 89. In this manner, it is possible to produce various syrups while excluding contact with the air until the syrup is withdrawn from the vapor-separating chamber. It will thus be apparent that various hydrolyzed products can be produced, or that the hydrolyzed product may consist of several different products of hydrolysis, if desired. In any event, the hydrolyzed product can be removed from the system and subjected to further treatment for separating, washing, or purifying the same.

The extent of the starch conversion, and correspondingly the character of the final product, is also determined in part by the use of an acid catalyst. While the process is capable of wide use without employment of an acid catalyst, it is often advantageous to use such an acid to accelerate the conversion. In the event that an acid catalyst is to be used, continuous acidulation is very desirable and can be effected by setting the pump 42 into operation. The acid will then be present uniformly in the stream undergoing heating and, if desired, a portion or all of this acid may be removed in vapor state from the upper end of the vapor-separating chamber 89.

On the other hand, it is often desirable to add alkali to the system to neutralize, at least partially, the resulting product. Such alkali is advantageously added to the closed system and the invention comprehends the continuous addition of this alkali. As shown in the drawing, the pump 43 can be set into operation to supply a proportioned amount of the alkali through a pipe 103 which preferably communicates with the elongated heating zone. As shown, the alkali is injected into the lower portion of the coil 51 and the stream turbulence is sufficient to mix the alkali uniformly. It is believed to be new to add proportioned amounts of acid and/or alkali to an elongated passage in which a starch-water dispersion is converted. Only sufficient alkali will be proportioned into the system to produce the desired neutral product which is removed from the lower end of the vapor-separating chamber 89.

Various changes and modifications can be made without departing from the spirit of the invention as defined in the appended claims.

This application is a continuation-in-part of my application Serial No. 46,697, filed October 25, 1935.

I claim as my invention:

1. A process for the continuous production of hydrolyzation products from starch, which process comprises: continuously pumping a starch-water dispersion into an elongated zone at sufficient pressure to effect continuous flow therethrough; applying heat to said elongated zone in amount sufficient to hydrolyze said starch and vaporize a portion of said water while maintaining such velocity in said elongated zone as will maintain the vapors uniformly dispersed in the stream; releasing said stream containing vapor, water, and hydrolyzed product into a vapor-separating chamber to separate vapors from the hydrolyzed product; and removing the separated vapors from said vapor-separating chamber at such rate as to maintain therein a pressure lower than in the zone in which heat is applied to said stream.

2. A process for the continuous production of hydrolyzation products from starch, which process comprises: continuously pumping a starch-water dispersion into an elongated zone at sufficient pressure to effect continuous flow therethrough; applying heat to said elongated zone in amount sufficient to hydrolyze said starch and vaporize a portion of said water while maintaining such velocity in said elongated zone as will maintain the vapors uniformly dispersed in the stream; releasing said stream containing vapor, water, and hydrolyzed product into a vapor-separating chamber to separate vapors from the hydrolyzed product; removing the separated vapors from said vapor-separating chamber at such rate as to maintain therein a pressure lower than in the zone in which heat is applied to said stream; and separately withdrawing the hydrolyzed product from said vapor-separating chamber.

3. A process for the continuous production of a subdivided hydrolyzed product from starch, which process comprises: continuously pumping a stream containing starch and water through an elongated heating zone while applying heat to said stream in said zone; releasing the heated stream into a substantially air-free vapor-separating chamber while at such temperature that vapors separate from the heated constituents of the stream to leave a subdivided hydrolyzed product; and separately withdrawing said vapors and said subdivided product from said vapor-separating chamber in such manner as to exclude air therefrom.

4. A process as defined in claim 3 including the step of withdrawing said vapors from said vapor-separating chamber at such rate as to maintain a partial vacuum therein.

5. A process for the continuous production of hydrolyzed products from starch, which process comprises: continuously pumping a stream of a starch-water dispersion into an elongated zone at sufficient pressure to move said stream therethrough; applying heat to said elongated zone to hydrolyze said starch and controlling the amount of heat supplied to said elongated zone to form water vapor therein and produce a heated stream containing water vapor uniformly dispersed therein; releasing the heated stream into a vapor-separating chamber from which air is excluded while said stream is at such temperature that vapors separate from the constituents of said stream at the reduced pressure in said vapor-separating chamber; and withdrawing said vapors from said vapor-separating chamber at such rate as to maintain a vacuum therein.

6. A process for the continuous production of hydrolyzed products from starch, which process comprises: continuously pumping a stream of a starch-water dispersion into an elongated zone while applying heat to said zone; restricting the discharge of said stream from said zone to build up a pressure therein which is sufficient to prevent substantial steam formation in said elongated zone; releasing the stream through said restriction directly into a vapor-separating chamber from which air is excluded while said stream is at such temperature that vapors separate from the constituents of said stream at the reduced pressure in said vapor-separating chamber; and withdrawing said vapors from said vapor-separating chamber at such rate as to maintain a vacuum therein.

7. A process for the continuous production of hydrolyzed products from starch, which process comprises: continuously pumping a stream containing starch and water through an elongated heating zone while applying heat to said stream in said zone to effect some conversion of said starch; continuing the movement of said stream in an elongated heat-transfer passage after it leaves said elongated heating zone and there cooling said stream to such a point that when the stream is released to the air no deleterious reactions will take place; and releasing said stream into an atmosphere comprising air while said stream is at such temperature that a portion of the water will flash into steam at the time of release.

8. A process for the continuous production of hydrolyzed products from starch, which process comprises: continuously pumping a stream containing starch and water through an elongated heating zone while applying heat to said stream in said zone in sufficient amount to form vapors therein whereby at least a part of the conversion taking place in said elongated heating zone is effected in the presence of vapors; moving the heated stream from said heating zone through a cooling zone and there cooling the stream to condense at least a portion of the vapors; and discharging the cooled stream into a vapor-separating chamber while still at a temperature sufficent to separate vapors from said stream in said vapor-separating chamber to form a hydrolyzed product of desired moisture content.

9. A process for the continuous production of hydrolyzed products from starch, which process comprises: continuously pumping a stream containing starch and water through an elongated heating zone while applying heat to said stream in said zone; moving the heated stream from said heating zone through a cooling zone; discharging the cooled stream into a vapor-separating chamber while at a temperature sufficient to separate vapors from said stream in said vapor-separating chamber to form a hydrolyzed product of desired moisture content; and continuously withdrawing the separating vapors from said vapor-separating chamber at a rate sufficient to maintain a partial vacuum therein.

10. A process of producing a hydrolyzed product from starch by use of a pipe means providing an elongated passage closed from the atmosphere, which process includes the steps of: continuously flowing a liquid stream of a dispersion of starch in water into and through said elongated passage closed from the atmosphere; heating said dispersion during flow through said elongated passage while maintaining a pressure therein; continuously introducing into said stream of dispersion flowing in said passage a liquid comprising a dilute acid solution before said stream completes its movement through said passage; discharging the resulting product from said passage and into a separating zone from which air is excluded while utilizing the heat added to said dispersion to separate sufficient water vapor to leave the hydrolyzed product in powdered and dehydrated form; and continuously removing from the separating zone the water vapors separated from the hydrolyzed product therein at such rate as to maintain a partial vacuum therein.

11. A process of producing a hydrolyzed product in powdered and dehydrated form from starch, which process includes the steps of: continuously flowing a stream of a dispersion of starch in water into and through a passage; heating said dispersion during flow through said passage while maintaining a pressure therein; continuously introducing into said stream of dispersion flowing in said passage a dilute acid solution before said stream completes its movement through said passage; continuously discharging a stream of the hydrolyzed products into an evaporating chamber closed from the atmosphere and maintained at a subatmospheric pressure, said stream being heated sufficiently while in said passage to cause water to separate as vapor from the hydrolyzed product at the pressure maintained in said evaporating chamber to leave a powdered and dehydrated product therein; withdrawing said vapor from said evaporating chamber at a sufficient rate to maintain said low pressure therein; and separately removing said powdered product from said evaporating chamber.

12. A process of producing a hydrolyzed product from starch by use of a long pipe, which process includes the steps of: flowing into one end of said long pipe a stream of a dispersion of starch in water from which the hydrolyzed product is to be formed; introducing into said long pipe a stream of a dilute acid in quantity proportioned to the quantity of said dispersion flowing in said stream; applying heat to a section of said pipe beyond the point of introduction of said dilute acid to form said hydrolyzed product; adding an alkali to the stream flowing through said pipe by introducing into said pipe at a section between the discharge end thereof and the point of introduction of said dilute acid a stream of alkali in quantity proportioned to the quantity of said dilute acid added; maintaining a superatmospheric pressure in said pipe by throttling the discharge of the hydrolyzed product from the discharge end of said pipe; discharging the throttled hydrolyzed product into an evaporating chamber closed from the atmosphere, the stream of products being heated sufficiently while in said pipe to cause water to separate in said evaporating chamber at the pressure existing therein; withdrawing said vapor from said evaporating chamber; and separately withdrawing the hydrolyzed product from said evaporating chamber.

13. A process of producing a hydrolyzed product from starch by the use of a pipe means providing an elongated passage closed from the atmosphere, which process includes the steps of: pumping into one end of said elongated passage closed from the atmosphere a liquid stream of a dispersion of starch in water at sufficient pressure to force same completely through said elongated passage; pumping into said stream while flowing in one portion of said passage a stream of a liquid comprising a dilute acid solution and mixing to form a stream of products moving through said elongated passage; heating said stream of products while flowing in said elongated passage under pressure induced by the pumping of said streams into said elongated passage; continuously pumping into said elongated passage at a position more advanced than the point of introduction of said acid solution a stream of alkaline material in sufficient quantity to substantially neutralize the acid; continuing the movement of the resulting stream through said elongated passage to effect substantial neutralization; and then and only then discharging the substantially neutral product from said elongated passage closed from the atmosphere.

14. A process of producing a hydrolyzed product from starch by the use of a pipe means providing an elongated passage closed from the atmosphere, which process includes the steps of: pumping into one end of said elongated passage closed from the atmosphere a liquid stream of a dispersion of starch in water at sufficient pressure to force same completely through said elongated passage; pumping into said stream while flowing in one portion of said passage a stream of a liquid comprising a dilute acid solution and mixing to form a stream of products moving through said elongated passage; heating said stream of products while flowing in said elongated passage under pressure induced by the pumping of said streams into said elongated passage; continuously pumping into said elongated passage at a position more advanced than the point of introduction of said acid solution a stream of alkaline material in sufficient quantity to substantially neutralize the acid; continuing the movement of the resulting stream through said elongated passage to effect substantial neutralization; then and only then discharging the substantially neutral product from said elongated passage closed from the atmosphere into an evaporating chamber also closed from the atmosphere and maintained at a pressure lower than the pressure in said elongated passage, the stream of products being heated sufficiently while in said elongated passage to cause water to separate in said evaporating chamber at the pressure maintained therein; withdrawing said vapor from said evaporating chamber at such rate as to maintain said low pressure therein; and separately withdrawing the hydrolyzed product from said evaporating chamber.

15. A method of producing a composite hydrolyzed product, which method includes the steps of: producing a stream of hydrolyzed product capable of additional hydrolyzation; by-passing a portion of said stream; additionally processing said by-passed portion to effect additional conversion; continuously returning the additionally-hydrolyzed by-passed portion to said stream; continuing the movement of said stream through an elongated passage to mingle the constituents of the by-passed and remaining portions of said stream; releasing the stream of mingled constituents into a vacuum chamber; and withdrawing vapor from said chamber at such rate as to maintain a vacuum therein.

RALPH EVERETT BURNS.

CERTIFICATE OF CORRECTION.

Patent No. 2,233,243. February 25, 1941.

RALPH EVERETT BURNS.

It is hereby certified that error appears in the printed specification of the above numbered patent requiring correction as follows: Page 2, first column, line 48, for the reference numeral "62" read --52--; page 5, second column, line 66, claim 9, for the word "separating" read --separated--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.